United States Patent
Gieras et al.

(10) Patent No.: US 9,859,047 B2
(45) Date of Patent: Jan. 2, 2018

(54) SOLENOID ACTUATORS AND SOLENOID ACTUATED DEVICES

(71) Applicant: Hamilton Sundstrand Corporation, Charlotte, NC (US)

(72) Inventors: Jacek F. Gieras, Glastonbury, CT (US); Gregory I. Rozman, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 95 days.

(21) Appl. No.: 14/822,695

(22) Filed: Aug. 10, 2015

(65) Prior Publication Data
US 2017/0047152 A1    Feb. 16, 2017

(51) Int. Cl.
*H01F 7/08*    (2006.01)
*F16K 31/06*    (2006.01)
*H01F 7/16*    (2006.01)

(52) U.S. Cl.
CPC ......... *H01F 7/081* (2013.01); *F16K 31/0644* (2013.01); *F16K 31/0675* (2013.01); *H01F 7/1607* (2013.01); *F16K 31/0651* (2013.01); *H01F 2007/085* (2013.01)

(58) Field of Classification Search
CPC ............. F16K 31/0644; F16K 31/0651; F16K 31/0675; F16K 31/082; H01F 7/081; H01F 7/121; H01F 7/13; H01F 7/1607; H01F 2007/086
USPC .......... 251/129.15, 129.17, 129.21; 335/262, 335/281
See application file for complete search history.

(56) References Cited

U.S. PATENT DOCUMENTS

| 2,863,473 | A | * | 12/1958 | Gantz | ................ F16K 31/0651 137/599.07 |
| 4,097,833 | A |   | 6/1978 | Myers | |
| 4,452,424 | A | * | 6/1984 | Kawata | ............... F16K 31/0648 137/625.33 |
| 4,453,700 | A | * | 6/1984 | Otsuki | .................. F16K 41/103 123/585 |

(Continued)

FOREIGN PATENT DOCUMENTS

DE    3418654 A1    11/1985
EP    2311058 A1    4/2011

(Continued)

OTHER PUBLICATIONS

European Search Report from European Patent Office dated Jan. 9, 2017 for European Application No. EP16183416.

*Primary Examiner* — Mary McManmon
*Assistant Examiner* — Richard K Durden
(74) *Attorney, Agent, or Firm* — Locke Lord LLP; Scott D. Wofsy; Christopher J. Cillié

(57) ABSTRACT

An electromagnetic solenoid actuator includes a ferromagnetic core body defining an axis, a winding supported by the core body, and a ferromagnetic plunger body translatable within the core body along the axis. The core body has a fixed height gap that extends about the axis and the plunger body and core body define between one another a variable height gap that extends about the axis. A first flux bypass extends through the fixed height gap and a second flux bypass extends through the variable height gap that cooperate with one another to correct the attraction force between the plunger and core body as height of the variable height gap changes.

15 Claims, 6 Drawing Sheets

(56) References Cited

U.S. PATENT DOCUMENTS

| | | | |
|---|---|---|---|
| 4,619,289 A | 10/1986 | Tsuru et al. | |
| 4,954,799 A * | 9/1990 | Kumar | H01F 7/13 |
| | | | 251/129.08 |
| 5,897,096 A * | 4/1999 | Nakano | F02M 3/075 |
| | | | 251/129.15 |
| 6,076,550 A | 6/2000 | Hiraishi et al. | |
| 6,715,732 B2 | 4/2004 | Kumar | |
| 7,591,281 B2 * | 9/2009 | Tsuge | F16K 31/0655 |
| | | | 137/495 |
| 7,874,541 B2 * | 1/2011 | Abe | F16K 31/0613 |
| | | | 137/625.69 |
| 8,081,053 B2 * | 12/2011 | Yamagata | H01F 7/081 |
| | | | 251/129.15 |
| 8,469,334 B2 * | 6/2013 | Yamagata | H01F 7/1607 |
| | | | 251/129.07 |
| 2010/0123535 A1 | 5/2010 | Yamagata et al. | |
| 2012/0242436 A1 | 9/2012 | Murao | |
| 2015/0097130 A1 | 4/2015 | Gieras et al. | |

FOREIGN PATENT DOCUMENTS

| | | |
|---|---|---|
| EP | 2406805 A1 | 1/2012 |
| EP | 2858075 A1 | 4/2015 |

* cited by examiner

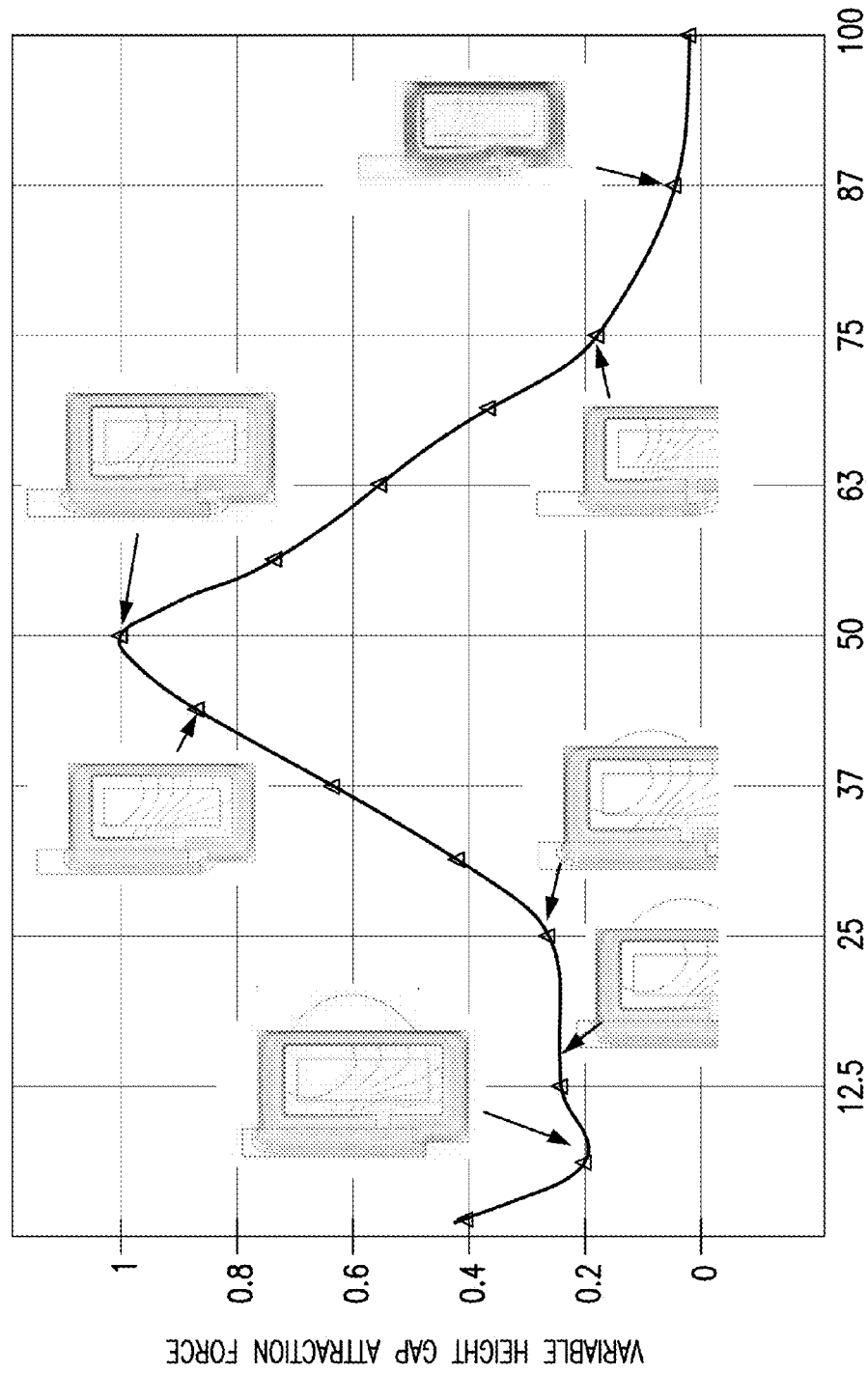

SOLENOID ACTUATORS AND SOLENOID ACTUATED DEVICES

BACKGROUND OF THE INVENTION

1. Field of the Invention

The present disclosure relates to solenoid actuators, and more specifically to solenoid actuators for solenoid-actuated valves in fluid distribution systems or other systems.

2. Description of Related Art

Solenoid actuators are short-stroke electromagnetic energy conversion devices that convert electrical energy into linear motion of a ferromagnetic plunger along a solenoid axis. Solenoid actuators are commonly used in a variety of applications, including as valve actuators for fluid systems. Solenoid actuators generally include helical coils wound about a ferromagnetic core separated from the ferromagnetic plunger by a variable air gap. The ferromagnetic plunger is typically biased away from the ferromagnetic core by a spring or similar element. Conventional solenoid actuators typically produce an electromagnetic attractive force between the ferromagnetic plunger and core that is inversely proportional to the square of the air gap width, i.e. according to Equation 1:

$$F = \frac{1}{2}\frac{B_g^2}{\mu_0}S_g = \frac{1}{2}\mu_0\frac{(IN)^2}{\left(\frac{l_{Fe}}{\mu_r}+g\right)^2}S_g \approx \frac{1}{2}\mu_0\frac{(IN)^2}{g^2} \quad \text{Equation 1}$$

where $B_g$ is the magnetic flux density in the air gap, $\mu_0 = 0.4\pi \times 10^{-6}$ H/m is the magnetic permeability of free space, $\mu_r$ is the relative magnetic permeability of the ferromagnetic core, $S_g$ is the surface area of the air gap, g is the air gap width, $I_{Fc}$ is the mean path length for magnetic flux through the ferromagnetic core, I is the coil current, and N is the number of turns of the coil. Some solenoid actuators use conical air gaps for an increase in attractive force by increasing air gap surface area $S_g$ with a slope angle α.

The inverse proportionality of the attractive force between the ferromagnetic plunger and core to the square of the air gap width can pose a challenge to fine actuator control. In conventional solenoid actuators, the attractive force between the plunger and core can be strongly nonlinear at smaller gap widths than at greater gap widths. Some solenoid actuator devices obtain an attraction force that is independent of the air gap fluctuation by employing a magnetic flux bypass. In such devices, as the air gap decreases, that attraction force also decreases. At relatively large air gaps, most the magnetic flux penetrates through the air gap, thus making the attraction force independent over a working range of plunger.

Such conventional methods and systems have generally been considered satisfactory for their intended purpose. However, there is still a need in the art for improved solenoid actuator that allows for improved attraction and force characteristics. The present disclosure provides a solution for this need.

SUMMARY OF THE INVENTION

An electromagnetic solenoid actuator includes a ferromagnetic core body defining an axis, a winding supported by the core body, and a ferromagnetic plunger body translatable within the core body along the axis. The core body has a fixed height gap that extends about the axis. The plunger body and core body define between one another a variable height gap. The variable height gap extends about the axis. A first flux bypass is defined within the fixed height gap and a second flux bypass is defined within the variable height gap that cooperate with one another to correct the attraction force between the plunger and core body as height of the variable height gap changes.

In certain embodiments, a non-ferromagnetic separation ring can be sealably seated within the fixed height gap. The variable height gap can be defined between opposing axial faces of the core body and the plunger body. An end of the plunger body defining an annular face can extend about the axis and face a direction of flow through the plunger body. The core body can have a shoulder bounding the variable height gap and physically limiting movement of the plunger body along the axis. The core body flux bypass can be disposed within the core body and may extend through the fixed height gap. The plunger body flux bypass can be disposed within the plunger body and may extend through the variable height gap.

In accordance with certain embodiments, the plunger body can axially overlap both the fixed height gap and the variable height gap over substantially the entire axial movement envelope of the plunger body. The axial height of the fixed height gap can be greater than a lateral width of the variable height gap. An axial separation distance between the fixed height gap and the variable height gap can be greater than a height of the fixed height gap. The axial separation distance between the fixed height gap and the variable height gap can be greater than a lateral width of the variable height gap. A distance between a face of the plunger body bounding the variable height gap and an end of the plunger body on an opposite side of the plunger body can be greater than a height of the fixed height gap. The distance can be greater than a lateral width of the variable height gap.

It is also contemplated that, in accordance with certain embodiments, an attraction force between the core body and the plunger body can be flat within a first height range of the variable height gap, increase within a second height range of the variable height gap, and decreases within a third height range of the variable height gap. Heights within the second height range can be greater than heights within the first height range. Heights within the third height range can be greater than the second height range.

A fluid valve includes a ferromagnetic solenoid core body with a fixed height gap extending about an axis, windings supported by the core body and disposed about a fluid inlet, and a bellows disposed to both carry fluid from the fluid inlet to the hollow ferromagnetic actuator core and to bias the hollow ferromagnetic solenoid actuator plunger against a valve seat in a seal. A hollow ferromagnetic solenoid actuator plunger body is aligned within the solenoid core body along the axis, is translatable within the core body along the axis, and defines a variable height gap between the solenoid plunger and core bodies. First and second magnetic flux bypasses extend through fixed and variable height gaps and cooperate to increase the attraction force between the plunger and core body increase as height of the variable height gap increases.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 6 is a composite chart of force and flux distribution as a function of the height of the variable height gap of the fluid valve, showing flux change in the flux bypasses in relation to variable height gap height and force.

DETAILED DESCRIPTION OF THE PREFERRED EMBODIMENTS

Figure 1:
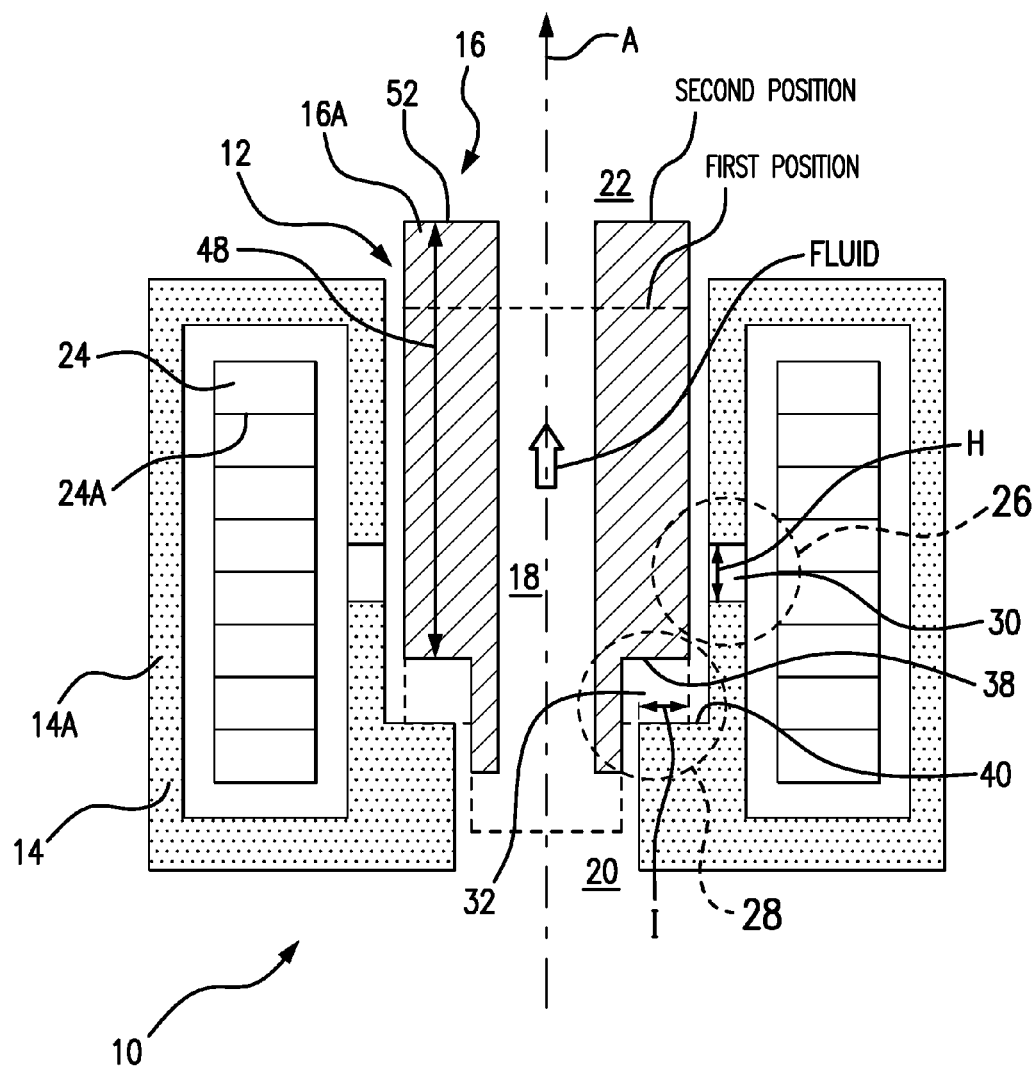
FIG. 1 is a schematic cross-sectional side elevation view of an exemplary embodiment of a fluid valve constructed in accordance with the present disclosure, showing a solenoid actuator.

Reference will now be made to the drawings wherein like reference numerals identify similar structural features or aspects of the subject disclosure. For purposes of explanation and illustration, and not limitation, a partial view of an exemplary embodiment of solenoid actuator and a fluid valve in accordance with the disclosure is shown in FIG. 1 and is designated generally by reference character 10. Other embodiments of solenoid actuators and solenoid actuated fluid valves in accordance with the disclosure, or aspects thereof, are provided in FIGS. 2-6, as will be described. The systems and methods described herein can be used in valves for fluid distribution systems, such as aircraft fuel systems. However, it is to be understood and appreciated that embodiments of actuators described herein may be used in other types of systems.

Referring now to FIG. 1, fluid valve 10 is shown. Fluid valve 10 includes an electromagnetic solenoid actuator 12 with a core body 14 and a plunger body 16. Core body 14 defines an axis A and a fluid channel 18 that extends between a fluid inlet 20 and a fluid outlet 22 of fluid valve 10. Core body 14 carries windings 24 and includes a ferromagnetic material 14A. Windings 24 include a conductive material 24A and are electrically connected to a direct current or an alternating current source (not shown for reasons of clarity). Plunger body 16 includes a ferromagnetic material 16A and is movably disposed along axis A for translation along axis A relative to core body 14 between a first position (shown in solid dashed lines) and a second position (shown in solid lines).

Electromagnetic solenoid actuator 12 includes a core body flux bypass 26 and a plunger flux bypass 28. Core body flux bypass 26 is disposed within core body 14, includes a portion of core body 14, and extends through a fixed height gap 30 defined within core body 14. Plunger body flux bypass 28 is disposed within a portion of plunger body 16 and extends through a variable height gap 32 defined between core body 14 and plunger body 16.

Figure 2:
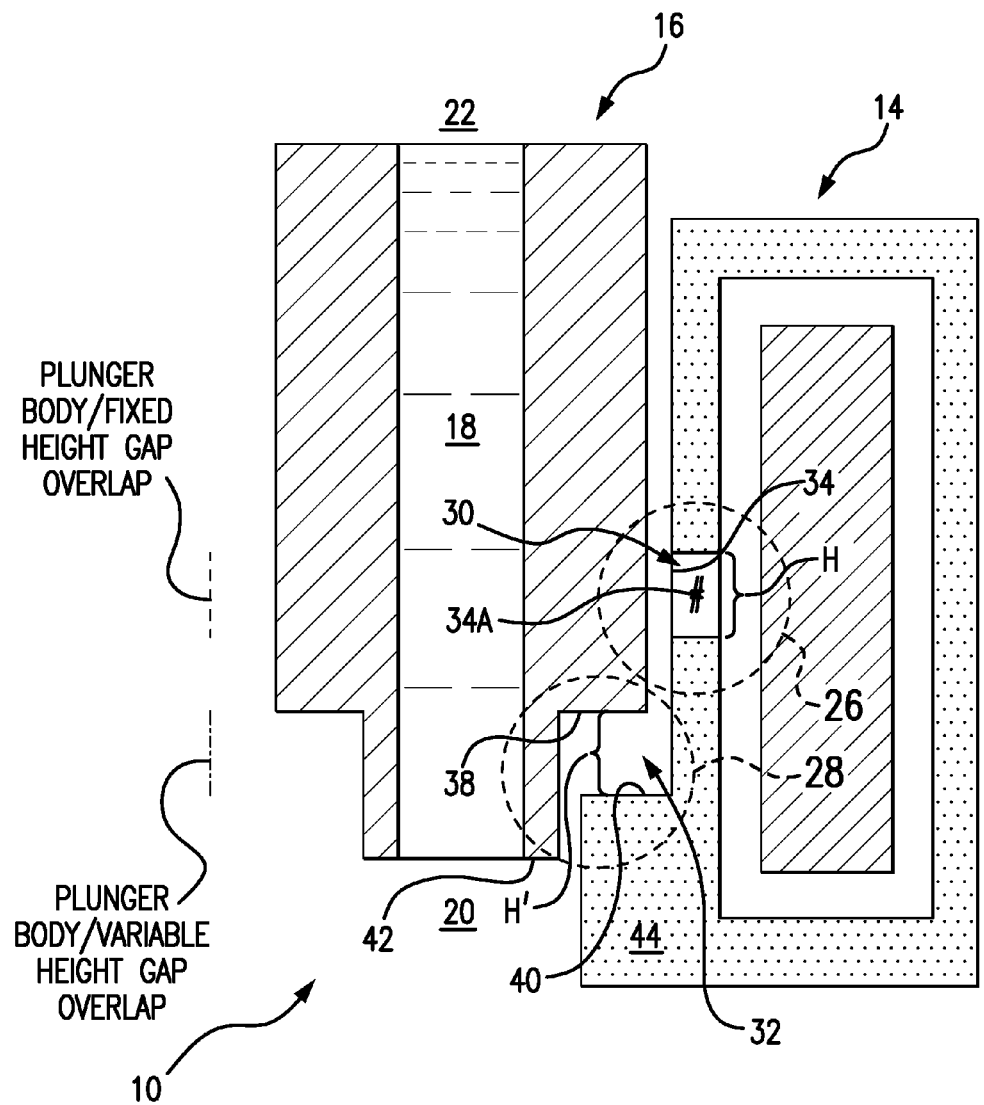
FIG. 2 is a schematic cross-sectional elevation view of a portion of the solenoid actuator of FIG. 1, showing a fixed height gap defined by the actuator core body and a variable height gap defined between the actuator core and plunger bodies.

With reference to FIG. 2, a portion of fluid valve 10 is shown including core body flux bypass 26 and plunger body flux bypass 28. Fixed height gap 30 (shown in FIG. 1) has a fixed height H and includes a separation ring 34. Separation ring 34 is seated within fixed height gap 30 and includes a non-ferromagnetic material 34A. It is contemplated that separation ring 34 be fixed within fixed height gap 30 by welding, brazing, or any other suitable fastening method such that fluid (shown in FIG. 1) traverses fluid channel 18 between fluid inlet 20 and fluid outlet 22.

Variable height gap 32 is defined between a face 38 of plunger body 16 and a face 40 of core body 14. Plunger body face 38 axially opposes core body face 40 and is separated therefrom by a height H' of variable height gap 32. Both plunger body face 38 and core body face 40 define substantially planar surfaces that, as illustrated in FIG. 2, are substantially orthogonal to axis A (shown in FIG. 1). An end of plunger body 16 defines plunger body face 38 and extends about axis A such that it opposes flow traversing fluid channel 18 between fluid inlet 20 and fluid outlet 22. Core body 14 has a core body shoulder 44 that extends inward from core body 14 and towards axis A such that core body face 40 opposes plunger body face 38 along axis A. It is contemplated that core body flux bypass 26 be disposed within core body 14 and extend through fixed height gap 30. It is also contemplated that plunger body flux bypass 28 be disposed within plunger body 16 and extend through variable height gap 32.

In the illustrated exemplary embodiment plunger body 16 axially overlaps both fixed height gap 30 and the variable height gap 32. In this respect plunger body 16 axially overlaps variable height gap 32 over substantially the entire axial translation movement range of plunger body 16. An axial height H of fixed height gap 30 can be greater than a lateral width I (shown in FIG. 1) of the variable height gap 32. An axial separation distance H'' (shown in FIG. 4) between fixed height gap 30 and the variable height gap 32 can be greater than axial height H of fixed height gap 30. As shown in FIG. 1, a distance 48 between face 38 of plunger body 16 bounding variable height gap 32 and an end 52 of plunger body 16 on an opposite side of plunger body 16 can be greater than axial height H of fixed height gap 30. Distance 48 can be greater than a lateral width I of variable height gap 32.

Figure 3:
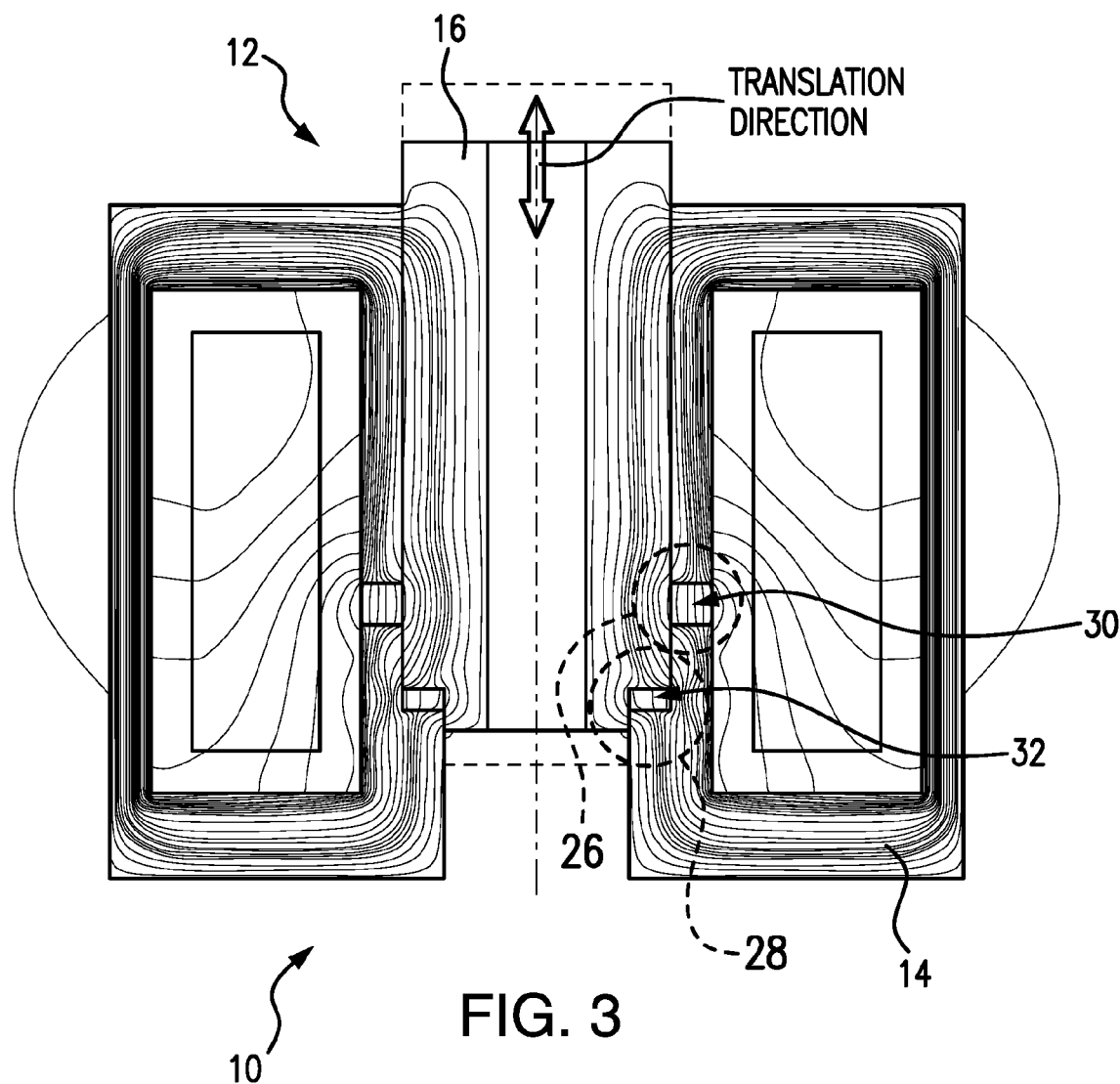
FIG. 3 is a schematic view of the fluid valve of FIG. 1, showing distribution of magnetic flux within the solenoid actuator at an exemplary plunger body position.
Figure 4:
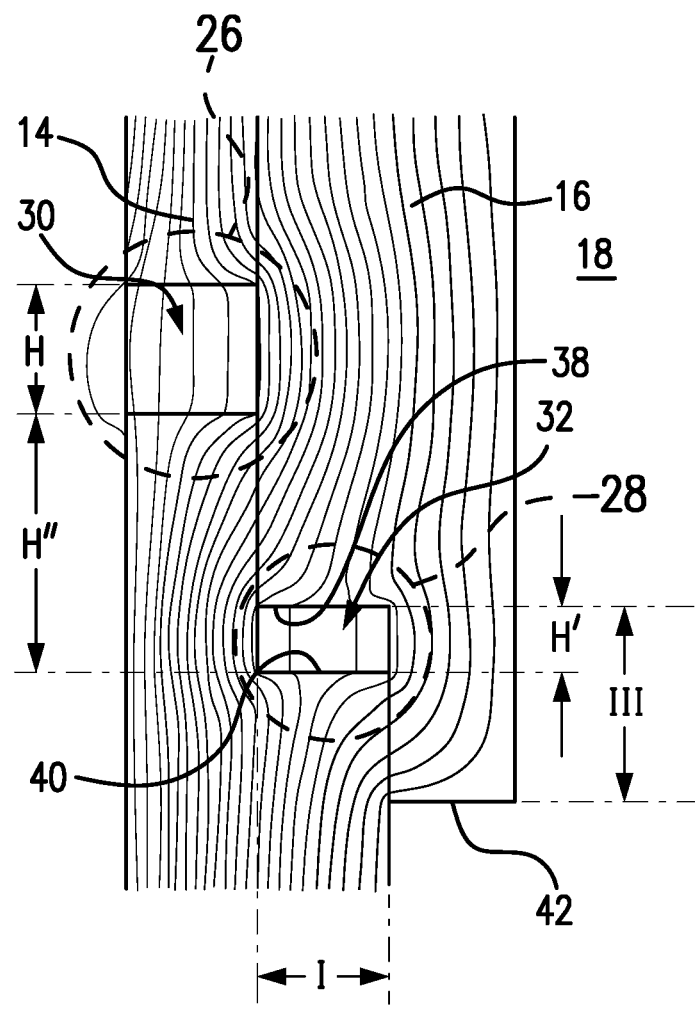
FIG. 4 is a schematic view of portion of the fluid valve of FIG. 1, showing distribution of flux within first and second flux bypasses formed by the fixed height gap and the variable height gap of the solenoid actuator.

With reference to FIG. 3 and FIG. 4, magnetic flux distributions within solenoid actuator 12 are shown for an illustrated exemplary position of plunger body 16 relative to core body 14. FIG. 4 shows exemplary relative dimensions fixed height gap 30 and variable height gap 32 and associated flux distributions therein within core body flux bypass 26 and plunger body flux bypass 28. Axial separation distance W is defined between fixed height gap 30 and core body face 40 and is greater than height H of fixed height gap 30 and lateral width I of variable height gap 32. A stepped face separation distance III between plunger body face 38 and a plunger body shoulder 42 bounding fluid channel 18 is greater than axial height H of fixed height gap 30 and lateral width I of variable height gap 32. This distance may be less than axial separation distance H''.

Change in the magnitude of flux in core body flux bypass 26 and plunger body flux bypass 28 corresponds to the dimensions of lateral width I, axial separation distance H", stepped face separation distance III, fixed height gap H, and the stroke of variable height gap H'. Since magnetic flux in core body flux bypass 26 and plunger body flux bypass 28 corresponds to the attraction force between plunger body 16 and core body 14 at a given value of variable height gap H", selecting the dimension for a given actuator allows for construction of solenoid actuators with any shape of force—stroke characteristic.

Figure 5:
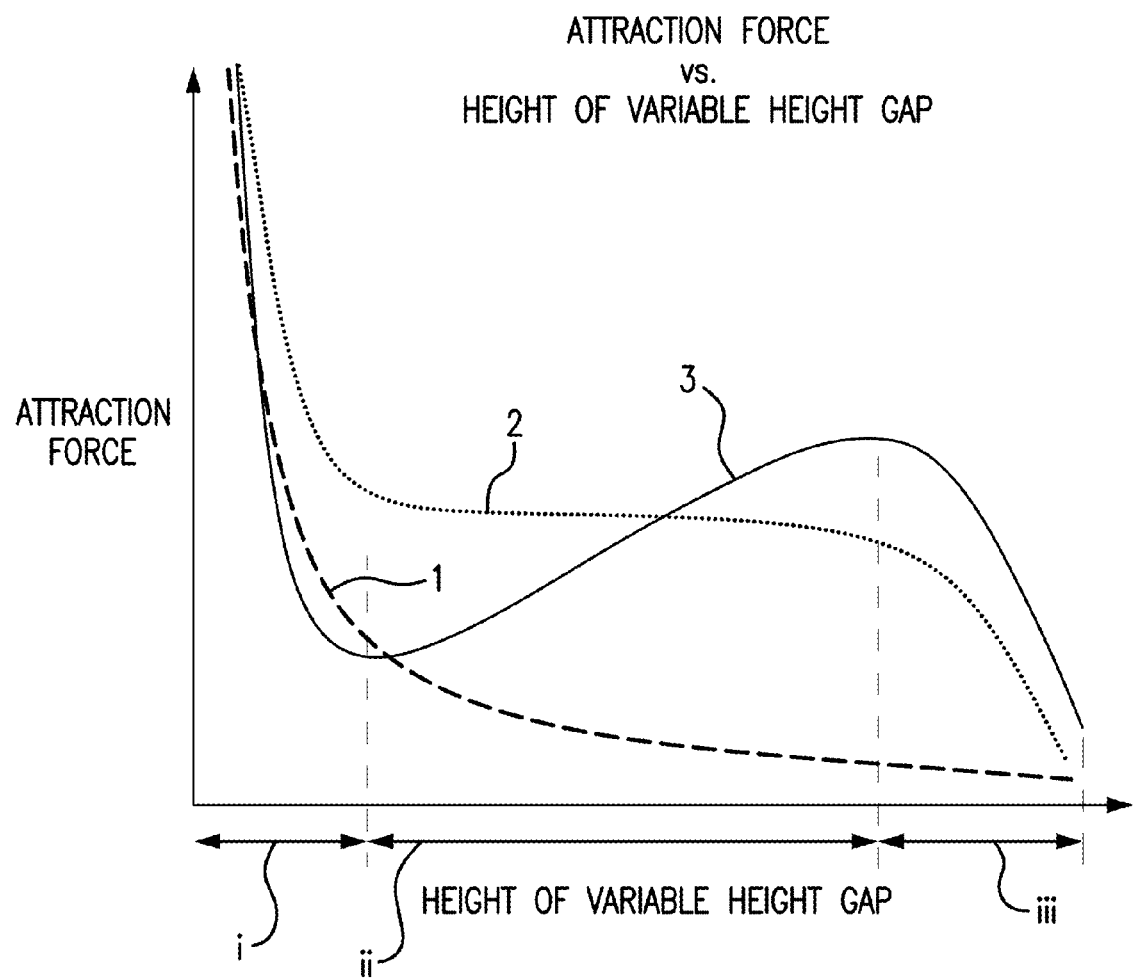
FIG. 5 is a comparative chart of force versus variable height gap of the fluid valve of FIG. 1, showing force increasing as the variable height increasing according to an embodiment.

For example, as shown in trace 1 of FIG. 5, the magnitude of the attraction force can decrease as variable height gap height H' increases. For example, if fixed height gap H has zero height, the attraction force monotonically decreases as the height of variable height H' increases, i.e., the stroke of solenoid actuator 12, as shown in trace 1 (illustrated with a dashed line). In embodiments described herein where axial height H' (shown in FIG. 4) of fixed height gap 30 (shown in FIG. 4) is greater than zero, the attraction force decreases initially, i.e. when the displacement distance is relatively small, and then increases as the height H' of variable height gap 32 increases beyond those relatively small values. In certain embodiments, the attraction force decreases when height H' of variable height gap 32 is between zero (0) and two (2) millimeters, and thereafter increases as height H' of variable height gap 32 increases from two (2) millimeters to larger values. This allows, as shown in trace 2 of FIG. 5 (illustrated in dotted line), selection of gap dimension that provide attraction forces that are substantially linear during most of the travel of core body 14 within which height H' of variable height gap height 32 increases. And as shown in trace 3 of FIG. 5 (illustrated with a solid line), embodiments of actuators described herein having the above-described dimensional relationships can have an attraction force that increases as magnitude of height H' of variable height gap 32 increases. In this respect, as indicated with trace 3, the attraction force between core body 14 and plunger body 16 decreases within a first height range i of variable height gap 32, increases within a second height range ii of variable height gap 32, and decreases within a third height range iii of variable height gap 32. Change in magnetic flux in both core body flux bypass 26 and plunger body flux bypass 28 are shown in FIG. 6.

In certain embodiments, solenoid actuators requiring very low power are provided. For example, in certain embodiments, an attraction force of about twenty (20) Newtons (about 4.5 inch-pounds) is generated within an air gap with a variable height of between one-half and three (3) millimeters. The forces can be generated using direct current power within the range of about one (1) and 1.5 Watts in an exemplary embodiment. As will be appreciated by those of skill in the art, the power losses in such solenoid actuators and fluid valves approach the Joules loss associated with the solenoid windings through current dissipation in the windings, approximating the direct current power consumption of the solenoid. Eddy current losses in the core body 14 due to movement of plunger body 16 can also be negligible. Such solenoid actuators and fluid valves may exhibit relatively low power loss and low winding temperature rises when energized, can therefore be cooled passive (e.g. by natural convection). They also can have only a single moving component, and therefore have improved reliability in comparison to solenoid actuators and fluid valves have two or more moving elements.

The methods and systems of the present disclosure, as described above and shown in the drawings, provide for solenoid actuators and solenoid actuated fluid valves with superior properties. For example, the attraction force can have an arbitrary force-stroke characteristic, arbitrary meaning that the relationship between the attraction force and the gap height within the stroke of the plunger can be selected according to characteristics of a contemplated application of the actuator. For example, the force can decrease, remain constant, increase, or change as a function of the plunger position within stroke of the plunger. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A solenoid actuator, comprising:
a ferromagnetic core body having a fixed height gap extending about an axis;
a winding supported by the core body; and
a ferromagnetic plunger body translatable within the core body along the axis between a first position and a second position and defining a variable height gap between the plunger body and the core body,
a core body flux bypass defined within the core body and extending through the fixed height gap; and
a plunger body flux bypass defined within the plunger body and extending through the variable height gap,
wherein the variable height gap has an axial height that is smaller than an axial height of the fixed height gap in the first position,
wherein the plunger body axially overlaps the fixed height gap and the variable height gap in the first position and in the second position,
and wherein the axial height of the variable height gap is larger than the axial height of the fixed height gap in the second position to increase an attraction force between the plunger body and core body as the plunger body moves between the first and second positions.

2. The solenoid actuator as recited in claim 1, further including a non-ferromagnetic separation ring sealably seated within the fixed height gap.

3. The solenoid actuator as recited in claim 1, wherein the variable height gap is defined between opposing axial faces of the core body and the plunger body.

4. The solenoid actuator as recited in claim 1, wherein an end of the plunger body defines an annular face extending about the axis.

5. The solenoid actuator as recited in claim 1, wherein core body has a shoulder bounding the variable height gap and physically limiting movement of the plunger body along the axis.

6. The solenoid actuator as recited in claim 1, wherein an axial height of the fixed height gap is greater than a lateral width of the variable height gap.

7. The solenoid actuator as recited in claim 1, wherein an axial separation distance between the fixed height gap and a core body face separated from a plunger body face by the variable height gap is greater than a height of the fixed height gap.

8. The solenoid actuator as recited in claim 1, wherein an axial separation distance between the fixed height gap and a core body face separated from a plunger body face by the variable height gap is greater than a lateral width of the variable height gap.

9. The solenoid actuator as recited in claim 1, wherein a distance between a face of the plunger body bounding the variable height gap and an end of the plunger body on an opposite side of the plunger body is greater than a height of the fixed height gap.

10. The solenoid actuator as recited in claim 1, wherein a distance between a face of the plunger body bounding the variable height gap and an end of the plunger body on an opposite side of the plunger body is greater than a lateral width of the variable height gap.

11. The solenoid actuator as recited in claim 1, wherein the attraction force between the core body and the plunger body decreases within a first height range of the variable height gap, increases within a second height range of the variable height gap between the first position and the second position, and decreases within a third height range of the variable height gap, heights within the second height range being greater than heights within the first height range, and heights within the third height range being greater than heights within the second height range.

12. The solenoid actuator as recited in claim 1, wherein the attraction force increases between the first position and the second without application of force from a biasing member.

13. A fluid valve, comprising:
a solenoid actuator as recited in claim 1, wherein the plunger body includes an inlet, an outlet arranged on an axially opposite end of the plunger body, and a channel through the plunger body,
wherein the outlet is in fluid communication with the inlet in both the plunger body first position and the plunger body second position.

14. The fluid valve as recited in claim 13, wherein the solenoid actuator does not include a resilient member to apply force against the plunger body.

15. A method of controlling a valve, comprising:
generating magnetic flux in a ferromagnetic core body having a fixed height gap extending about an axis by applying electrical current to a winding;
translating a ferromagnetic plunger body within the core body along the axis between a first position and a second position, wherein the translating increases height of a variable height gap defined between the plunger body and the core body; and
increasing magnitude of an attraction force exerted on the plunger body by the magnetic flux with co-operation of a core body flux bypass and a plunger body flux bypass, the core body flux bypass defined within the core body and extending through the fixed height gap, and the plunger body flux bypass defined within the plunger body and extending through the variable height gap.

* * * * *